United States Patent [19]

Oono

[11] 4,394,994

[45] Jul. 26, 1983

[54] TAPE FAST-FORWARDING AND REWINDING APPARATUS

[75] Inventor: Hirotoshi Oono, Yokohama, Japan

[73] Assignee: Victor Company of Japan, Kanagawa, Japan

[21] Appl. No.: 275,282

[22] Filed: Jun. 19, 1981

[30] Foreign Application Priority Data

Jun. 20, 1980 [JP] Japan .................................. 55-83553

[51] Int. Cl.³ .......................... G03B 1/04; G11B 15/32
[52] U.S. Cl. .................................. 242/200; 242/202; 318/6; 360/73
[58] Field of Search ................ 242/186, 191, 200-202; 235/92 R, 92 MP; 318/6, 7; 360/71, 73, 74.1, 74.2, 50

[56] References Cited

U.S. PATENT DOCUMENTS

| | | | |
|---|---|---|---|
| 3,912,990 | 10/1975 | Kuhnlein et al. | 318/7 |
| 4,125,881 | 11/1978 | Eige et al. | 360/50 |
| 4,163,532 | 8/1979 | Sakai | 242/186 |
| 4,318,140 | 3/1982 | Shigeta | 360/73 |
| 4,366,371 | 12/1982 | de Costemore d'Arc | 235/92 MP |

*Primary Examiner*—Leonard D. Christian
*Attorney, Agent, or Firm*—Posnack, Roberts, Cohen & Spiecens

[57] ABSTRACT

A tape fast-forwarding and rewinding apparatus comprising a rotation driving circuit for driving a motor for rotating a take up or supply reel so that the tape travels at a first fast-forwarding or rewinding speed, or travels at a second fast-forwarding or rewinding speed, the latter speed being faster than the former, a detection circuit for detecting the radii of wound tape respectively on the take-up and supply reels, and a memorizing circuit for memorizing the ratio of the radii of the wound tape detected by the detection circuit, while the tape is travelling at the first fast-forwarding or rewinding speed. A controlling circuit serves for controlling the rotation driving circuit so that the tape travels at the second fast-forwarding or rewinding speed after travelling at the first fast-forwarding and rewinding speed, and for controlling the rotation driving circuit so that the speed of the tape changes to the first fast-forwarding or rewinding speed from the second fast-forwarding or rewinding speed when the aforesaid value of the reciprocal of the radii ratio, when the tape is travelling at the second fast-forwarding or rewinding speed, is equal to the value of the ratio memorized in the memorizing circuit.

6 Claims, 12 Drawing Figures

TAPE FAST-FORWARDING AND REWINDING APPARATUS

BACKGROUND OF THE INVENTION

The present invention generally relates to tape fast-forwarding and rewinding apparatuses in magnetic recording and/or reproducing apparatuses, and more particularly to a tape fast-forwarding and rewinding apparatus which is capable of fast-forwarding and rewinding a tape at especially high speed, to perform the tape fast-forwarding and rewinding operations within a short period of time.

Generally, in a cassette tape recorder, the fast-forwarding and rewinding of the cassette tape is performed in which a reel positively takes up the tape, by directly driving and rotating a tape take-up side reel or a tape supply side reel in a state where a pinch roller is separated from a capstan. In the above case, the fast-forwarding and rewneding operations are performed by feeding the tape in a positive direction or a reverse direction at a speed which is faster that the normal travelling speed of the tape when the tape is travelled by the capstan and the pinch roller upon recording and reproduction.

However, both ends of the cassette tape are respectively fixed to a pair of reel hubs through lead tapes. At a point where the tape fast-forwarding or rewinding operation is completed and all the tape is taken up by the supply side reel hub or the take-up side reel hub, a rotational driving force is still being applied to the reel hub of the above pair of reel hubs which has taken up the tape. However, since the one end of the tape is fixed to the reel hub which feeds the tape, the movement of the tape is forcibly stopped, and the tape fast-forwarding or rewinding operation is terminated. Moreover, since the travelling of the tape is abruptly stopped, an abrupt tension is applied to the tape.

Thus, conventionally, the tape travelling speed upon fast-forwarding and rewinding operations were selected so that the tape or the lead tape is not cut due to the abrupt tension applied to the tape, and so that the lead tape does not come off from the reel hub, upon the above described abrupt stopping of the tape. Accordingly, the tape travelling speed upon fast-forwarding and rewinding operations can be set higher than the normal travelling speed of the tape, however, the above tape travelling speed cannot be set to an excessively high speed. Therefore, there was a disadvantage in that a considerable time was required to take up and wind all the tape on one reel hub in a state where all the tape is taken up and wound on the other reel hub. Hence, in a case where a radio program is to be recorded, for example, there was a disadvantage in that the beginning portion of the radio program cannot be recorded when the tape must be travelled by fast-forwarding or rewinding to a desired position on the tape (for a duration of one minute or more, for example), since the radio program will have started by the time the tape fast-forwarding or rewinding operation is completed. On the other hand, when the rotational speed of the reel hub is simply increased in order to increase the tape travelling speed, the tape can be cut or the tape can be disconnected from the reel hub as described above, although the time required to perform these tape fast-forwarding and rewinding operations can be reduced.

SUMMARY OF THE INVENTION

Accordingly, a general object of the present invention is to provide a novel and useful tape fast-forwarding and rewinding apparatus in which the above described problems have been overcome.

Another and more specific object of the present invention is to provide a tape fast-forwarding and rewinding apparatus which performs the fast-forwarding and rewinding operations at a speed which is higher than that upon the conventional and normal fast-forwarding and rewinding operations, at an intermediate stage within the fast-forwarding and rewinding operations.

Still another object of the present invention is to provide a tape fast-forwarding and rewinding apparatus constructed so that the rotational periods of a pair of reels after a predetermined time has elapsed from the time the tape fast-forwarding or rewinding operation is started, are detected, and the ratio between the two rotational periods of the pair of reels are memorized, the tape travelling speed is set at a high speed, and the tape travelling speed is returned to the normal tape travelling speed for performing the fast-forwarding or the rewinding operation when the ratio of the above two rotational periods becomes of a reciprocal relationship.

Other objects and further features of the present invention will be apparent from the following detailed description when read in conjunction with the accompanying drawings.

DETAILED DESCRIPTION

Figure 1:
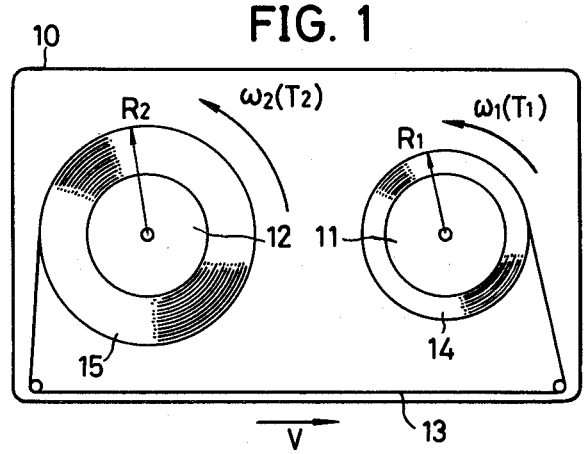
FIG. 1 is a plan view showing an example of a cassette tape which is fast-forwarded and rewound in an apparatus according to the present invention.

Generally, a tape cassette is constructed as shown in FIG. 1. Reel hubs 11 and 12 provided within a cassette 10 respectively are wound with a magnetic tape 13, and have tape rolls 14 and 15. Both ends of the magnetic tape 13 are respectively fixed to the reel hubs 11 and 12 through lead tapes. When the cassette 10 is loaded within a cassette tape recorder and a tape fast-forwarding operation is performed, the reel hub 11 is positively rotated towards the direction of an arrow shown in FIG. 1, to take up the magnetic tape 13. Accordingly, as the tape fast-forwarding operation progresses, a radius R1 of the tape roll 14 becomes large, and a radius R2 of the tape roll 15 becomes small. On the other hand, when a tape rewinding operation is performed, the reel hub 12 is positively rotated towards a direction opposite to the direction of another arrow shown in FIG. 1, to take up the magnetic tape 13. Therefore, as the tape rewinding operation progresses, the radius R2 of the tape roll 15 becomes large, and the radius R1 of the tape roll 14 becomes small.

When rotational angular velocities and rotational periods of the reel hubs 11 and 12 are respectively designated by $\omega 1$, $\omega 2$, $T1$, and $T2$, and the tape travelling speed is designated by $V$, the following relationships described by equations (1), (2), and (3) stand.

$$V = R1\omega 1 = R2\omega 2 \qquad (1)$$

$$\omega 2/\omega 1 = T1/T2 \qquad (2)$$

From equations (1) and (2),
$$R1/R2 = T1/T2 \qquad (3)$$

Accordingly, the ratio between the radii of the tape rolls 14 and 15 at a certain point in time can be known, if the ratio between the rotational periods T1 and T2 in the above equation (3) is measured.

Figure 2:
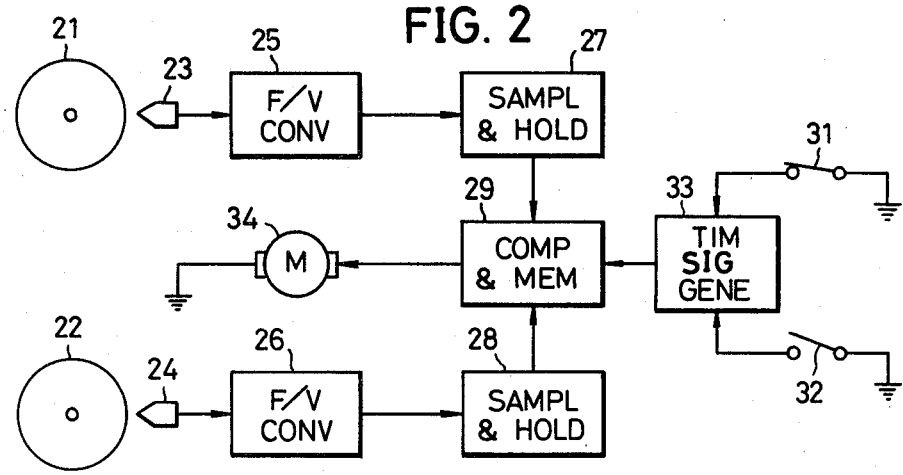
FIG. 2 is a simplified systematic block diagram showing a first embodiment of a tape fast-forwarding and rewinding apparatus according to the present invention.

In FIG. 2, rotary bodies 21 and 22 are respectively mounted to reel shafts which fit into the reel hubs 11 and 12, of the cassette 10 which is loaded into a predetermined position. Detectors 23 and 24 are respectively provided for detecting the rotation of the rotary bodies 21 and 22. In a case where the rotary bodies 21 and 22 are slit plates having slits formed therein, the detectors 23 and 24 can be of a known construction having combinations of a light-emitting element and a light-receiving element opposing each other and having the slit plate placed therebetween.

Detected output signals of the detectors 23 and 24 respective of the rotational periods or rotational frequencies of the rotary bodies 21 and 22, are respectively supplied to frequency-voltage (F/V) converters 25 and 26, wherein the detected output signals thus supplied to the F/V converters 25 and 26 are respectively converted into a voltage respective of the rotational periods or rotational frequencies of the rotary bodies 21 and 22. Output voltages thus obtained from the F/V converters 25 and 26 are respectively supplied to sample-and-hold (S/H) circuits 27 and 28, wherein the output voltages are sampled and held. Hence, the sampled and held voltages obtained from these S/H circuits 27 and 28 are respectively supplied to a comparing and memorizing circuit 29.

When a fast-forward starting switch 31 or a rewind starting switch 32 is closed, a timing pulse having a predetermined time width is produced from a timing signal generating circuit 33. This timing pulse thus generated by the above timing signal generating circuit 33 is supplied to the comparing and memorizing circuit 29.

In a case where the tape fast-forwarding operation is to be performed in a state in which almost all the magnetic tape 13 is taken up by the reel hub 12 (that is, R2>R1), for example, the switch 31 is closed. Then, a motor 34 is applied with a first predetermined voltage, and starts to rotate. Thus, the reel shaft on the take-up side is transmitted with the rotational force of the motor 34 and rotated, and the reel hub 11 rotates to take up the magnetic tape 13. Therefore, the magnetic tape 13 starts to travel from a time t0 when the switch 31 is closed, and the travelling speed of the magnetic tape 13 reaches a first predetermined speed V1 at a time t1 when the motor 34 reaches a predetermined rotational speed which is determined by the first predetermined voltage. This first predetermined speed V1 is the same speed as that used upon conventional tape fast-forwarding and rewinding operations.

Figure 4A:
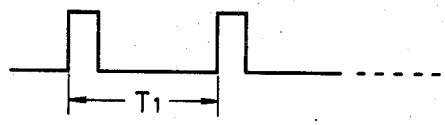
FIGS. 4A through 4D are diagrams respectively showing the rotational period detecting signal of a supply side reel hub and a take-up side reel hub.
Figure 4C:
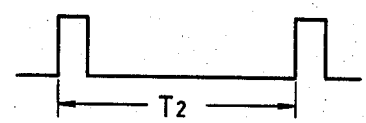
Figure 4B:
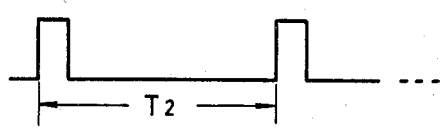

At a time t2 which occurs after the time t1, the comparing and memorizing circuit 29 memorizes the ratio between the output voltages obtained from the S/H circuits 27 and 28 (which corresponds to the ratio between the rotational periods T1 and T2 of the reel hubs 11 and 12 shown in FIGS. 4A and 4B). Accompanied with the above memorizing operation performed by the comparing and memorizing circuit 29, a second predetermined voltage which is larger than the first predetermined voltage is applied to the motor 34, and the motor 34 is accordingly rotated at a high speed. Hence, the travelling speed of the magnetic tape 13 reaches a predetermined travelling speed V2 at a time t3. The travelling speed V2 is selected to a speed which is approximately two to four times the speed V1, for example.

During the time when the magnetic tape 13 is fast-forwarded at a high speed V2, the comparing and memorizing circuit 29 compares the ratio between the rotational periods of the reel hubs 11 and 12 which are memorized in advance, and the reciprocal of the ratio between the rotational periods of the reel hubs 11 and 12 which are obtained from the S/H circuits 27 and 28 (that is, the ratio between the rotational periods of the reel hubs 12 and 11). Furthermore, at a time t4 when the above values which are compared become equal, the comparing and memorizing circuit 29 sets the voltage applied to the motor 34 to the above first predetermined voltage. Accordingly, the tape travelling speed is reduced, and the travelling speed of the magnetic tape 13 is reduced to the first predetermined speed V1 at a time t5.

Figure 4D:
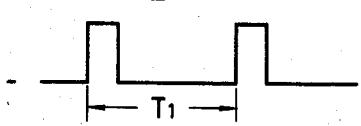

When the ratio between the rotational periods T1 and T2 of the reel hubs 11 and 12 shown in FIGs. 4A and 4B at the time t2, and the reciprocal of the ratio between the rotational periods T1 and T2 of the reel hubs 11 and 12 shown in FIGS. 4C and 4D at the time t4 become equal, this means that the ratio between the diameters R1a and R2a of the tape rolls 14 and 15 at the time t2 and the ratio between the diameters R2b and R1b of the tape rolls 15 and 14 become equal. That is, it is indicated that the completion of the fast-forwarding operation is near. Accordingly, the tape travelling speed is reduced at the time t4.

The magnetic tape 13 is moved at the speed V1, and when all the magnetic tape 13 is taken up from the reel hus 12, the movement of the magnetic tape 13 is forcibly stopped since the end part of the magnetic tape 13 is fixed to the reel hub 12 through the lead tape. Hence, the travelling speed of the magnetic tape 13 becomes zero at a time t6.

The tape rewinding operation is similarly performed as in the above described case for the tape fast-forwarding operation. In this case, the tape rewinding operation is started from a state where the relationship R1>R2 between the radii of the tape rolls 14 and 15 stands.

Since the operation performed during a tape rewinding operation is similar to the tape fast-forwarding operation as stated above, the description of the operation will be omitted.

Figure 5:
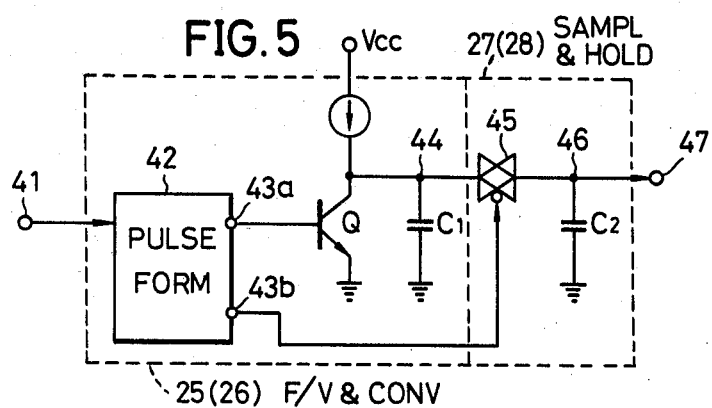
FIG. 5 is a concrete systematic circuit diagram showing an example of a frequency/voltage converting circuit and sample-and-hold circuit in the block system shown in FIG. 2.
Figure 6:
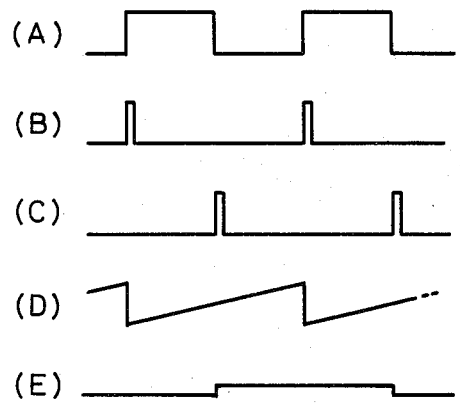
FIGS. 6(A) through 6(E) are signal waveform diagrams respectively showing the signal waveforms at each part of the circuit system shown in FIG. 5.

Next, an example of a concrete circuit system of the F/V converter 25 (26) and the S/H circuit 27 (28) is shown in FIg. 5. The output signal of the detector 23 (24) shown in FIG. 6(A) which is applied to a terminal 41, is supplied to a pulse forming circuit 42. A reset pulse and a sampling pulse shown in FIGS. 6(B) and 6(C) which are respectively obtained from output terminals 43a and 43b of the pulse forming circuit 42, are respectively applied to the base of a transistor Q of a saw-tooth wave generating circuit and to an analog switch 45. A capacitor C1 is charged by a power source voltage Vcc through a constant current circuit, and the discharge of the capacitor C1 is performed through the above transistor Q when the reset pulse is applied to the transistor Q. Accordingly, a voltage having a saw-tooth waveform shown in FIG. 6(D) is obtained at a point 44.

The analog switch 45 samples the saw-tooth waveform voltage in response to the sampling pulse applied thereto. This sampled voltage is charged in a capacitor C2 and held. Therefore, the voltage obtained at a point 46 becomes as shown in FIG. 6(E), and the held voltage is then supplied to the comparing and memorizing circuit 29 through a terminal 47. When the rotational speed (rotational period) of the reel hubs 11 and 12 vary, the period of the output signal obtained from the detector 23 which is shown in FIG. 6(A), varies accordingly. Moreover, the periods of the pulses shown in FIGS. 6(B) and 6(C) also vary in response to the above variation. Thus, the held voltage shown in FIG. 6(E) also varies. As a result, the held voltage thus obtained, is a voltage corresponding to the rotational periods of the reel hubs 11 and 12.

Figure 7:
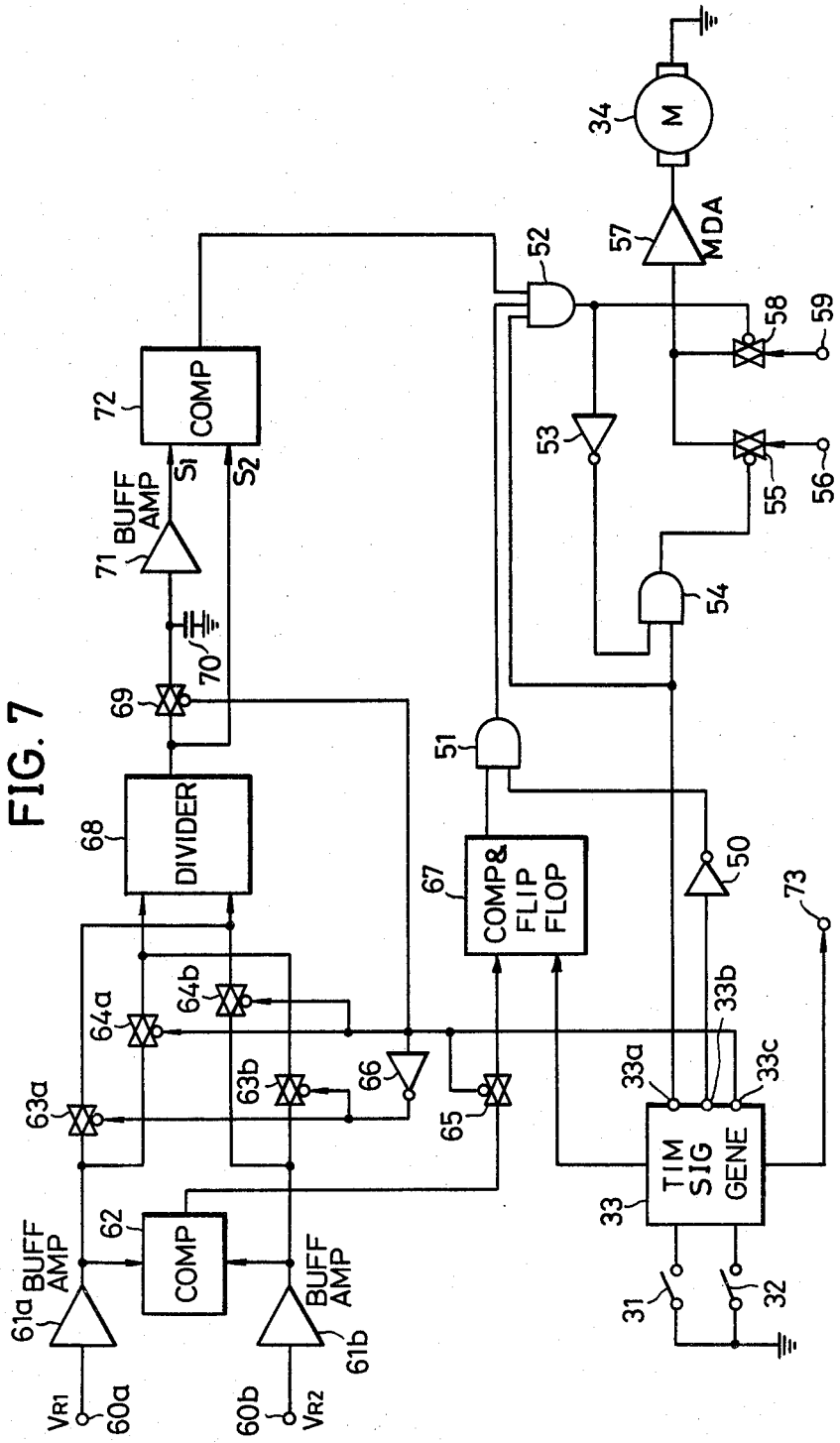
FIG. 7 is a concrete systematic circuit diagram showing an embodiment of a comparing and memorizing circuit which forms an essential part of the block system shown in FIG. 2.

An embodiment of a concrete circuit system of the comparing and memorizing circuit 29, is shown in FIG. 7.

In FIG. 7, the switch 31 is closed upon starting of the tape fast-forwarding operation. Hence, a signal which becomes a high (H) level from the closing time t0 of the switch 31, is obtained from an output terminal 33a of the timing signal generating circuit 33. On the other hand, a signal which is of H-level during the time between the times t0 and t2, is obtained from an output terminal 33b of the timing signal generating circuit 33. In addition, a sampling pulse is obtained from an output terminal 33c of the timing signal generating circuit 33 at the time t3.

Figure 3:
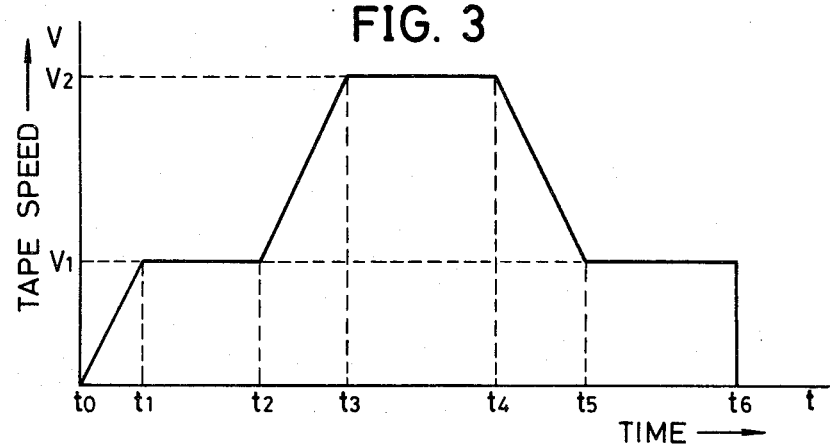
FIG. 3 is a time chart showing the change in the tape travelling speed of the tape which is fast-forwarded and rewound by the apparatus according to the present invention.

The H-level signal obtained from the output terminal 33b is inverted by an inverter 50 into a low (L) level signal, and then applied to one terminal of an AND-gate 51. Accordingly, the output of the AND-gate 51 is of L-level, and the output of an input AND-gate 52 also becomes of L-level. Hence, a H-level signal obtained by inverting the output signal of the AND-gate 52 at an inverter 53, is applied to one input terminal of an AND-gate 54. On the other hand, a H-level signal obtained from the output terminal 33a is applied to the other input terminal of the AND-gate 54. Thus, the output of the AND-gate 54 becomes of H-level, and an analog switch 55 is turned ON. Therefore, a normal fast-forwarding voltage obtained from a terminal 56, is applied to the motor 34 through a motor driving amplifier 57, and the motor 34 thus starts to rotate. Accordingly, the travelling speed of the magnetic tape 13 which is taken up by the reel hub 11 and driven, becomes as shown in FIG. 3 at the times corresponding to the times t0, t1, and t2. It is seen from FIG. 3 that at the time t2, the travelling speed of the magnetic tape 13 is the normal fast-forwarding speed V1.

When the reel hub 11 rotates to take up the magnetic tape 13, the reel hub 12 is also rotated. That is, the rotary bodies 21 and 22 are respectively rotated with rotational periods respective of the radii R1 and R2 of the tape rolls 14 and 15 on the reel hubs 11 and 12. The signals detected at the detectors 23 and 24, and which has passed through the F/V converters 25 and 26, and the S/H circuits 27 and 28, are respectively applied to terminal 60a and 60b. These signals thus applied to the terminals 60a and 60b, are respectively supplied to a comparator 62 through buffer amplifiers 61a and 61b, and also supplied to analog switches 63a, 63b, 64a, and 64b as shown in FIG. 7.

During the interval between the times t0 and t2, analog switches 64a, 64b, 65 and 69 are OFF, since the output obtained from the output terminal 33c is of L-level. Further, the analog switches 63a and 63b which are respectively applied with a H-level signal from an inverter 66, are ON. Accordingly, the outputs of the buffer amplifiers 61a and 61b are respectively supplied to a divider 68 through the analog switches 63a and 63b. The output of the divider 68 is supplied to a comparator 72, however, since the analog switch 69 is OFF, the output of the divider 68 is not memorized in a capacitor 70. Moreover, comparison between the outputs of the buffer amplifiers 61a and 61b is performed by the comparator 62, however, since the analog switch 65 is OFF, the output which indicates the relationship R1<R2 is not supplied to a comparator and flip-flop circuit 67.

Next, at the time t2, the output obtained from the output terminal 33a remains at H-level, however, the output obtained from the output terminal 33b becomes of L-level. Hence, a sampling pulse is produced from the output terminal 33c.

The analog switches 64a, 64b, 65, and 69 become ON due to the pulse supplied from the output terminal 33c. On the other hand, the analog switches 63a and 63b which are supplied with a L-level signal through the inverter 66, become OFF. The outputs of the buffer amplifiers 61a and 61b are respectively supplied to the divider 68 wherein the outputs thus supplied to the divider 68 are divided, since the analog switches 64a and 64b are respectively ON. Therefore, a signal respective of the ratio between the outputs of the buffer amplifiers 61a and 61b, that is, a signal respective of the ratio between the rotational periods of the reel hubs 11 and 12 at the time t2, is produced from the divider 68. This output of the divider 68 is applied to the capacitor 70 which constructs a memory circuit, through the analog switch 69, and memorized therein.

In addition, the signal which indicates the relationship R1<R2 obtained as a result of the comparing operation performed in the comparator 62, is supplied to the comparator and flip-flop circuit 67 through the analog switch 65. On the other hand, due to the closing of the fast-forward starting switch 31, a signal which indicates the fast-forwarding mode is supplied to the comparator and flip-flop circuit 67 from the timing signal generating circuit 33. The circuit 67 compares and memorizes that the output of the comparator 62 is a signal indicating the relationship R1<R2, and that the signal from the timing signal generating circuit 33 is a fast-forwarding mode signal, and then supplies a H-level signal to the AND-gate 51. The circuit 67 also produces a H-level signal when the output of the comparator 62 is a signal indicating the relationship $R1 > R2$, and the rewind starting switch 32 is closed and the signal from the timing signal generating circuit 33 is a rewind mode signal. However, when the input signal is a combination of signals other than those described above, the output signal of the circuit 67 becomes of L-level.

In the above described state, a H-level signal is applied to the AND-gate 51 through the inverter 50. Accordingly, the output of the AND-gate 51 becomes of H-level, and this H-level signal is applied to the AND-gate 52. The AND-gate 52 is applied with the H-level signals from the output terminal 33a and the comparator 72, and thus, when a H-level signal is applied to the AND-gate 52 from the AND-gate 51 at the time t2, the output of the AND-gate 52 becomes of H-level.

An analog switch 58 is supplied with a H-level signal from the AND-gate 52, and is in an ON state. Hence, a high speed fast-forwarding voltage which is higher than the voltage at the terminal 56, is applied to the motor 34 from the terminal 59, through the motor driving amplifier 57. Moreover, the AND-gate 54 is applied with a L-level signal from the inverter 53. Therefore, the output of the AND-gate 54 becomes of L-level, and the analog switch 55 becomes OFF. The motor 34 is applied with a high speed fast-forwarding voltage, and accordingly rotates at a high speed. Therefore, the moving speed of the magnetic tape 13 reaches the speed V2 at the time t3 as shown in FIG. 3, and the magnetic tape 13 is from then on moved at the tape moving speed V2.

After the generated sampling pulse obtained from the output terminal 33c disappears at the time t2, the analog switches 64a, 64b, 65, and 69 respectively become OFF, and the analog switches 63a and 63b become ON. Accordingly, the outputs of the buffer amplifiers 61a and 61b are respectively supplied to the divider 68 through the analog switches 63a and 63b, in a state where the relationship between the outputs of the buffer amplifiers 61a and 61b is opposite to that when the outputs of the buffer amplifiers 61a and 61b are supplied through the analog switches 64a and 64b. The signals thus supplied to the divider 68 are respectively divided, and a signal S2 which corresponds to the reciprocal of the ratio between the outputs of the buffer amplifiers 61a and 61b, that is, the reciprocal of the ratio between the rotational periods of the reel hubs 11 and 12 is produced from the divider 68.

The output S2 of the divider 68 is constantly supplied to the comparator 72 wherein the output of the divider 68 is compared with a signal S1 corresponding to the ratio between the outputs of the buffer amplifiers 61a and 61b at the time t2 which was previously memorized in the capacitor 70, that is, the ratio between the rotational periods of the reel hubs 11 and 12, which is supplied to the comparator 72 through a buffer amplifier 71. The comparator 72 produces a coincidence signal when the signals S1 and S2 become equal (at the time t4), that is, when the ratio $R1a/R2a$ between the radii of the tape rolls 14 and 15 at the time t2 becomes equal to the reciprocal of the ratio $R2b/R1b$ between the radii of the tape rolls 14 and 15, and the output of the comparator 72 accordingly becomes of L-level.

Since the output of the comparator 72 becomes of L-level, the output of the AND-gate 52 also becomes of L-level, and the analog switch 58 becomes OFF. On the other hand, the AND-gate 54 is applied with a H-level signal from the inverter 53. Hence, the output of the AND-gate 54 becomes of H-level, and the analog switch 56 becomes ON. Therefore, a normal fast-forwarding voltage is applied to the motor 34 from the terminal 56, through the motor driving amplifier 57. Accordingly, as shown in FIG. 3, the tape travelling speed decreases from the time t4, and again returns to the normal fast-forwarding speed V1 at the time t5. From then on, when all the magnetic tape 13 is taken up by the supply side reel hub 12, the magnetic tape 13 is stopped at the time t6.

The interval between the times t3 and t4 in which the tape travelling speed is V2 can be made large, by setting the intervals between the times t1 and t2 and the times t5 and t6 in which the tape travelling speed is V1 to short intervals. In this case, the tape fast-forwarding operation can be performed within s shorter period of time. When the tape fast-forwarding operation is performed from a state where all the magnetic tape 13 is taken up by the supply side reel hub 12, it took approximately one minute to complete the tape fast-forwarding operation in the conventional system in which the magnetic tape travels at the speed V1 throughout the entire duration of the tape fast-forwarding operation. However, in the present embodiment of the invention, the tape fast-forwarding operation can be completed within a short period of time of approximately fifteen to twenty seconds.

Furthermore, in a case where the tape fast-forward starting switch 31 is closed in a state in which the radius R1 of the tape roll 14 is larger than the radius R2 of the tape roll 15, the signal supplied to the comparator and flip-flop circuit 67 from the comparator 62 at the time t2, is a signal indicating the relationship $R2 < R1$. Thus, no coincidence can be obtained between the fast-forwarding signal supplied from the timing signal generating circuit 33 and the above signal from the comparator 62 at the time t2, and the signal supplied to the AND-gate 51 from the circuit 67 becomes of L-level. Accordingly, in this case, the analog switch 56 becomes ON, and a normal fast-forwarding voltage is applied to the motor 34, to perform a normal tape fast-forwarding operation.

Accordingly, in a case where the relationship $R1 \geq R2$ stands upon starting of the tape fast-forwarding operation (more strictly, including a case where the radius R2 is slightly larger than the radius R1 at the time t0, since the case where the relationship $R1 = R2$ stands at the time t2 is also included), the high speed tape fast-forwarding operation according to the present invention is not performed, and only the normal tape fast-forwarding operation is performed. However, the maximum time required to perform the tape fast-forwarding operation in the above described case is in the range of thirty seconds, which is within an allowable range from the practical point of view.

When the tape rewind starting switch 32 is closed in a state where the relationship $R1 < R2$ stands, a high speed tape rewinding operation is performed at the speed V2 between the times t3 and t4, as in the above described case. Moreover, a polarity changeover signal is applied to the motor driving amplifier 57 from the timing signal generating circuit 33, through a terminal 73, due to the closing of the above switch 32. Hence, the motor 34 is rotated in the reverse direction.

Next, a second embodiment of a tape fast-forwarding and rewinding apparatus according to the present invention, will be described in conjunction with FIGS. 8 and 9.

Figure 8:
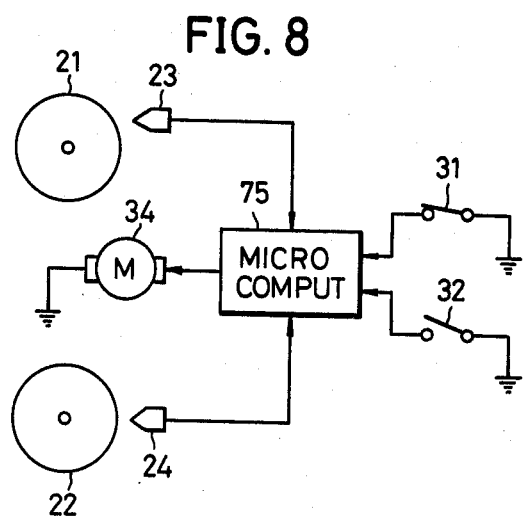
FIG. 8 is a simplified systematic block diagram showing a second embodiment of a tape fast-forwarding and rewinding apparatus according to the present invention.
Figure 9:
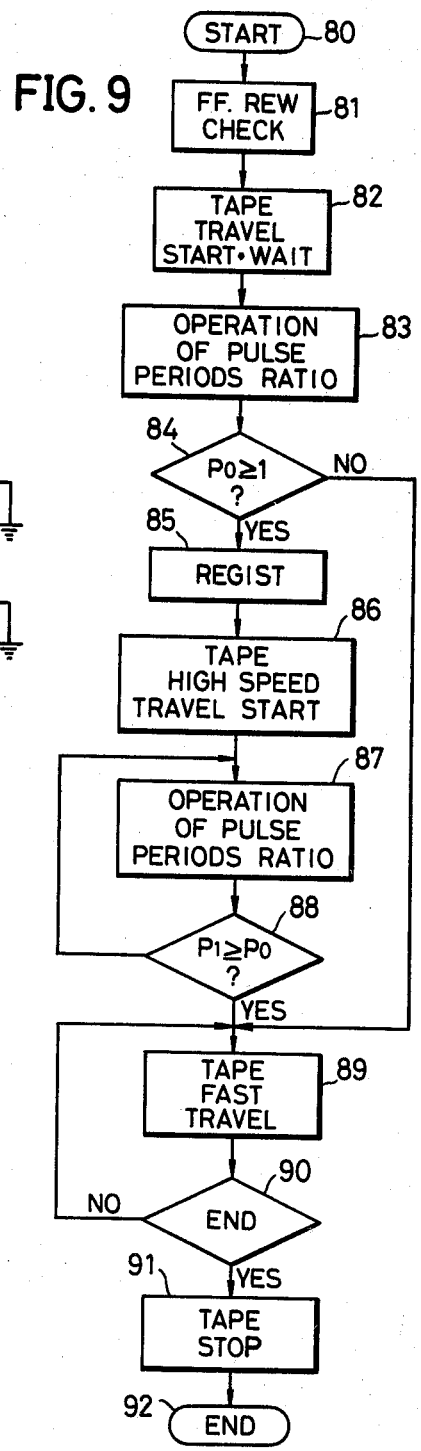
FIG. 9 is a flow-chart for explaining the operation of a micro-computer in the block system shown in FIG. 8.

In FIG. 8, those parts which are the same as those corresponding aprts in FIG. 2 are designated by like reference numerals, and their description will be omitted. In FIG. 8, the output signals of the detectors 23 and 24, and the closing signals of the tape fast-forward starting switch 31 and the tape rewind starting switch 32, are respectively supplied to a micro-computer 75.

The operation of the micro-computer 75 will now be described in conjunction with FIG. 9. When the tape fast-forward starting switch 31 is closed, the operation of the micro-computer 75 is started from a step 80. At a succeeding step 81, comparison is performed between tape fast-forwarding mode, tape rewinding mode, and the size relationship of the radii R1 and R2 of the tape rolls 14 and 15. In a case where the relationship R1<R2 stands during the tape fast-forwarding mode, or the relationship R2<R1 stands during the tape rewinding mode, the tape travel is started at a succeeding step 82. In cases other than the two cases described above, the tape travel is in a waiting mode.

When the tape travel is started, the ratio between the rotational periods of the reel hubs 11 and 12 (rotary bodies 21 and 22) is calculated at a step 83. Next, discrimination is made on whether the calculated ratio P0 is larger than 1 (unity), at a step 84. In a case where the result obtained as a result of the discrimination is NO, that is, when the rotational period of the rotary body 21 is larger than that of the rotary body 22, a step 89 is performed, to perform a normal tape fast-forwarding operation.

In a case where the result obtained as a result of the discrimination at the above step 84 is YES, the claculated result P0 is stored (memorized) into a register at a step 85. In addition, a high speed tape fast-forwarding operation is started at a step 86. During the time in which the above high speed fast-forwarding operation is performed, the ratio P1 between the rotational periods of the reel hubs 11 and 12 (rotary bodies 21 and 22), that is, the reciprocal of the ratio between the rotational periods of the rotary bodies 22 and 21, is calculated at a step 87. Discrimination is made on whether the value of the ratio P1 is larger than the value of the ratio P0 which is previously memorized at the register, at the step 88. When the result of the discrimination performed at the step 88 is NO, the high speed tape fast-forwarding operation is continued by returning to the above step 87.

In a case where the result of the discrimination performed at the step 88 is YES, that is, when the value of the ratio P1 at least becomes equal to the value of the ratio P0, a succeeding step 89 is performed, and the tape travelling speed is returned to the normal tape fast-forwarding speed. In addition, discrimination is made on whether the finishing end of the tape has been reached, at a step 90. When the result of the discrimination performed at the step 90 is NO, the tape continues to travel at the normal tape fast-forwarding speed during the time when the above discrimination result at the step 90 is NO. However, when the discrimination result at the step 90 becomes YES, the tape travel is stopped at a succeeding step 91. Moreover, the whole apparatus is put into a tape fast-forwarding operation completed state, at a step 92.

Description with respect to the tape rewinding operation will be omitted, since the operation is similar to that performed during the above tape fast-forwarding operation.

In the above embodiments of the invention, the rotaional force of the single motor 34 is selectively changed over the transmitted to the reel hubs 11 and 12, during the tape fast-forwarding operation and the tape rewinding operation. However, motors can be separately provided for each of the reel hubs, to selectively change over and rotationally drive these reel hubs.

Further, this invention is not limited to these embodiments but various variations and modifications may be made without departing from the scope of the invention.

What is claimed is:

1. A tape fast-forwarding and rewinding apparatus comprising:
   rotating means for rotating a tape take-up side reel in a direction so as to take up a tape upon tape fast-forwarding mode, and for rotating a tape supply side reel in a direction so as to take up the tape upon tape rewinding mode;
   rotation driving means for driving said rotating means so that the tape which is taken up by said tape take-up side reel or said tape supply side reel travels at a first fast-forwarding or rewinding speed, and so that the tape travels at a second fast-forwarding or rewinding speed which is a high speed faster than said first fast-forwarding or rewinding speed;
   detection means for substantially detecting the radii of tape rolls of wound tape which are wound around both the take-up side and the supply side reel rotated by said rotating means.
   memorizing means for memorizing a ratio between the radii of the tape rolls of wound tape which are substantially wound around both the reels obtained by said detection means, when said tape is travelling at said first fast-forwarding or rewinding speed; and
   controlling means for controlling said rotation driving means so that said tape travels at said second fast-forwarding or rewinding speed after travelling at said first fast-forwarding and rewinding speed, and controlling said rotation driving means so that the speed of said tape becomes said first fast-forwarding or rewinding speed from said second fast-forwarding or rewinding speed when a value which is a reciprocal of the ratio between the radii of the tape rolls of wound tape which are substantially wound around both the reels obtained by said detection means when said tape is travelling at said second fast-forwarding or rewinding speed, is equal to the value of the ratio memorized in said memorizing means, as a result of comparison performed.

2. A tape fast-forwarding and rewinding apparatus as claimed in claim 1 in which said rotating and driving means has means for applying a first voltage corresponding to said first fast forwarding or rewinding speed and a second voltage which is larger than said first voltage and corresponding to said second fast-forwarding or rewinding speed, to said rotating means.

3. A tape fast-forwarding and rewinding apparatus as claimed in claim 2 in which said controlling means comprises:
   applying voltage changeover means for applying said first voltage to said rotating means in response to the starting of the tape fast-forwarding or rewinding operation, and changing over to apply said second voltage to said rotating means after a predetermined time has elapsed from when said first voltage was applied;

comparing means for comparing the value of the ratio memorized in said memorizing means and a reciprocal value of the ratio which is detected when said tape is travelling at said second fast-forwarding or rewinding speed; and means for changing over said applying voltage changeover means in response to an output of said comparing means when the compared values of the ratios are equal to each other, so that the voltage applied to said rotating means is changed over from said second voltage to said first voltage.

4. A tape fast-forwarding and rewinding apparatus as claimed in claim 1 in which said controlling means controls said rotation driving means so that said tape travels only at said first fast-forwarding or rewinding speed in a case where said detection means detects that the radius of the tape roll on the tape take-up side reel is larger than the radius of the tape roll on the tape supply side reel and the apparatus is in a tape fast-forwarding mode, or in a case where said detection means detects that the radius of the tape roll on the tape supply side reel is larger than the radius of the tape roll on the take-up side reel and the apparatus is in a tape rewinding mode.

5. A tape fast-forwarding and rewinding apparatus as claimed in claim 1 in which said detection means is means for detecting respective rotational periods or rotational speeds of both said reels.

6. A tape fast-forwarding and rewinding apparatus as claimed in claim 1 in which said second fast-forwarding or rewinding speed is selected at a speed which is approximately two to four times said first fast-forwarding or rewinding speed.

* * * * *